United States Patent [19]

Etchu et al.

[11] Patent Number: 5,556,691
[45] Date of Patent: Sep. 17, 1996

[54] BIAXIALLY ORIENTED LAMINATED POLYESTER FILM AND MAGNETIC RECORDING MEDIUM HAVING THE SAME AS BASE FILM

[75] Inventors: Masami Etchu, Yokohama; Hirofumi Murooka; Kei Mizutani, both of Sagamihara; Makoto Handa, Yamato, all of Japan

[73] Assignee: Teijin Limited, Osaka, Japan

[21] Appl. No.: 186,585

[22] Filed: Jan. 26, 1994

[30] Foreign Application Priority Data

Jan. 27, 1993 [JP] Japan ............................ 5-011772
Dec. 9, 1993 [JP] Japan ............................ 5-309159

[51] Int. Cl.$^6$ ............................................ B32B 5/16
[52] U.S. Cl. ..................... 428/141; 428/219; 428/220; 428/323; 428/480; 428/694 SG; 428/694 ST; 428/910; 428/903.3
[58] Field of Search .................. 428/694 ST, 694SG, 428/323, 480, 910, 213, 215, 141, 219, 220, 903.3

[56] References Cited

U.S. PATENT DOCUMENTS

| | | | |
|---|---|---|---|
| 4,550,049 | 10/1985 | Ono et al. ............................. | 428/141 |
| 4,818,581 | 4/1989 | Katoh et al. ........................... | 428/143 |
| 5,069,962 | 12/1991 | Okazaki et al. ....................... | 428/323 |
| 5,279,881 | 1/1994 | Kotani .................................... | 428/141 |
| 5,374,467 | 12/1994 | Sato ....................................... | 428/413 |

FOREIGN PATENT DOCUMENTS

| | | |
|---|---|---|
| 0347656 | 12/1989 | European Pat. Off. . |
| 0453276 | 10/1991 | European Pat. Off. . |
| 0490665 | 6/1992 | European Pat. Off. . |
| 0502745 | 9/1992 | European Pat. Off. . |

OTHER PUBLICATIONS

Database WPI Week 9406, Derwent Publications Ltd., London, GB; AN 94–045341 & JP–A–6 000 929 (TEIJIN LTD) 11 Jan. 1994.

*Primary Examiner*—D. S. Nakarani
*Assistant Examiner*—H. Thi Le
*Attorney, Agent, or Firm*—Sherman and Shalloway

[57] ABSTRACT

A biaxially oriented laminated polyester film comprising a first thin polyester layer containing large-diameter inert particles and small-diameter inert particles; a second polyester layer containing large-diameter inert particles; and a third thin polyester layer containing large-diameter inert particles and small-diameter inert particles, the biaxially oriented laminated polyester film satisfying the following expression (1), $$0.4 < \frac{W_2 \cdot D_2}{W_1 \cdot D_{13}} < 2.5 \quad (1)$$

wherein:

$W_1$ is the content (wt. %) of the large-diameter inert particles in the first thin polyester layer, $W_2$ is the content (wt. %) of the large-diameter inert particles in the second polyester layer, $D_{13}$ is a total of the thickness (μm) of the first thin polyester layer and the thickness (μm) of the third thin polyester layer, and $D_2$ is the thickness (μm) of the second polyester layer. This film is useful as a base film for a magnetic medium.

25 Claims, 1 Drawing Sheet

BIAXIALLY ORIENTED LAMINATED POLYESTER FILM AND MAGNETIC RECORDING MEDIUM HAVING THE SAME AS BASE FILM

DETAILED DESCRIPTION OF THE INVENTION

Figure 1:
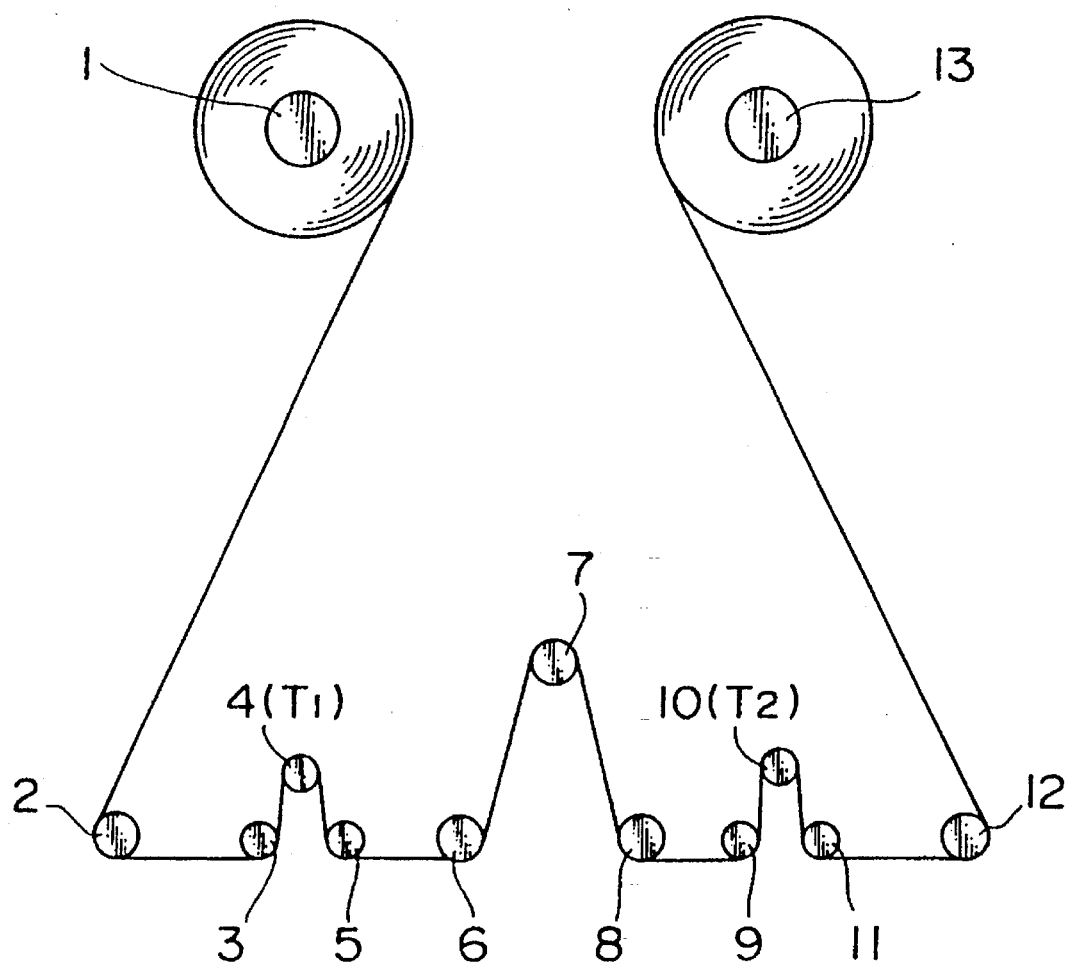

The present invention relates to a biaxially oriented laminated polyester film and a magnetic recording medium of which the base film is formed therefrom. More specifically, it relates to a biaxially oriented laminated polyester film which particularly has a smooth surface but is excellent in winding properties and abrasion resistance and which can be produced at a low cost. A biaxially oriented polyester film typified by a polyethylene terephthalate film is widely used as a base film for magnetic recording media such as a magnetic tape and a floppy disk due to its excellent physical and chemical properties.

The lubricity and abrasion resistance of the biaxially oriented polyester film are crucial factors which greatly influence the handling property at the film production step and the processing step in various fields of its use and which further greatly influence the product quality.

For example, when the polyester film has insufficient lubricity, the film produces wrinkles or causes blocking when wound up in the form of a roll, and the roll has an uneven surface to decrease the yield of it as a product. The preferred ranges of tension, contact pressure and rate for taking up the film are also narrowly limited, and it is very difficult to wind it up. Further, when a magnetic tape produced therefrom is allowed to run in a video tape recorder, the tape having poor lubricity shows increased running tension, and as a result, the running may be discontinued, abrasion dust may be caused, or magnetically recorded signals may drop out, or a so-called drop-out may be caused. Moreover, the tape may be loosely wound into a magnetic tape cassette and the tape running in a video tape recorder may be therefore unstable. When the so-called pan cake which is the wound-up magnetic tape reel before loading into a cassette is wound up loosely, it may be broken easily.

The polyester film is generally improved in lubricity by roughening a film surface by (i) precipitating inert particles from the catalyst residue into a polymer during the step of production of the polymer or (ii) adding inert particles. In general, as the size of the particles in the film increases and as the content thereof increases, the lubricity improves.

Meanwhile, the base film for magnetic recording media is required to have a flat surface, and the flatness is required to be as high as possible for improving the electromagnetic characteristics. When the surface roughness of the base film is too large, the toughened surface of the base film reflects in a magnetic layer surface formed on the base film and degrades the electromagnetic characteristics of a magnetic tape. As the size of the particles in the base film increases and as the content thereof increases, the surface roughness increases to degrade the electromagnetic characteristics.

For achieving these two contradicting properties of improvement in lubricity and improvement in electromagnetic characteristics at the same time, there is widely known a method in which a two-layered laminated film is used: One surface on which a magnetic layer is formed is flattened for improving the electromagnetic characteristics, and the other surface is roughened for improving the lubricity.

However, the above method has the following problems. Since the lubricity greatly differs between the two surfaces, a wrinkle occurs during the processing step. Since the surface on which a magnetic layer is to be formed is poor in lubricity, it is difficult to form a magnetic coating and it is difficult to increase the coating rate.

In a process for producing a biaxially oriented polyester film, an unstretched film is prepared by cooling a molten polyester extruded in the form of a sheet to solidify it, and then the unstretched film is simultaneously or consecutively biaxially oriented to impart the film with desired mechanical properties. In this biaxially orienting, the film is oriented in the width direction by clamping the edge portion of the film and moving the clamps on rails such that the width is consecutively broadened. This edge portion is wasted or recycled since it cannot be part of a product. When the above film is a two-layered laminated film and when the so-recycled film is used as part of a polymer as a raw material, the particles contained in each layer of the two-layered laminated film are randomly included in the polymer to alter the surface roughness. Japanese Laid-open Patent Publication No. 53585/1976 proposes the use of a polymer of the so-recycled film as an intermediate layer of a three-layered laminated film. For avoiding the influence of the particles contained in the intermediate layer on the surface roughness, it is necessary to increase the thickness of the surface layer, and the three-layered laminated film shows only the same properties as those of a single-layered film.

It is therefore an object of the present invention to provide a novel biaxially oriented laminated polyester film.

It is another object of the present invention to provide a biaxially oriented laminated polyester film which satisfies contradicting requirements such as improvement in the lubricity of film surface and improvement in electromagnetic characteristics, and which can be produced at a low cost.

It is another object of the present invention to provide a biaxially oriented laminated polyester film which, when its surface layer contains relatively-large-diameter inert particles and small-diameter inert particles, is excellent not only in lubricity such as winding properties and running durability but also in abrasion resistance and further which can be produced at a low cost.

It is another object of the present invention to provide a biaxially oriented laminated polyester film which has a content ratio of particles having a relatively large particle diameter in the surface layer to particles having a relatively large particle diameter in the intermediate layer per a unit area in a predetermined range, and which is excellent in lubricity and abrasion resistance.

It is yet another object of the present invention to provide a biaxially oriented laminated polyester film which has surface layers having a relatively small thickness and an intermediate layer containing particles having a relatively large particle diameter in an amount smaller than the surface layer and which exhibits the above-described excellent properties.

Other objects and advantages of the present invention will be apparent from the following description.

According to the present invention, the above objects and advantages of the present invention will be achieved by a biaxially oriented laminated polyester film comprising:

(A) a first thin polyester layer having a thickness of 0.4 to 2 μm, formed of an aromatic polymer containing;
   (a1) large-diameter inert particles having an average particle diameter, da1, of 0.4 to 2.0 μm and (a2) small-diameter inert particles having an average particle diameter, da2, of 0.01 to 0.3 µm, the content of the large-diameter inert particles (a1) being 0.05 to 0.55% by weight, the content of the small-diameter inert particles (a2) being 0.05 to 0.5% by weight, (B) a second polyester layer formed of an aromatic polyester containing;

(b1) large-diameter inert particles having an average particle diameter, db1, of 0.4 to 2.0 µm, and (C) a third thin polyester layer formed of an aromatic polyester containing;

(c1) large-diameter inert particles having an average particle diameter, dc1, of 0.4 to 2.0 µm and (c2) small-diameter inert particles having an average particle diameter, dc2, of 0.01 to 0.3 µm, the content of the large-diameter inert particles (c1) being 0.05 to 0.55% by weight, the content of the small-diameter inert particles (c2) being 0.05 to 0.5% by weight, the first thin polyester layer, the second polyester layer and the third thin polyester being laminated in the above order, the biaxially oriented laminated polyester film satisfying the following expression (1), $$0.4 < \frac{W_2 \cdot D_2}{W_1 \cdot D_{13}} < 2.5 \quad (1)$$

wherein:

$W_1$ is the content (wt. %) of the large-diameter inert particles (a1) in the first thin polyester layer, $W_2$ is the content (wt. %) of the large-diameter inert particles (b1) in the second polyester layer $D_{13}$ is the total of the thickness (µm) of first thin polyester layer and the thickness (µm) of the third thin polyester layer, and $D_2$ is the thickness (µm) of the second polyester layer.

FIG. 1 is a schematic view of an apparatus for measuring biaxially oriented laminated polyester films of the present invention for running friction coefficient (µk), pin abrasion and winding properties.

In the biaxially oriented laminated polyester film of the present invention, the first thin polyester layer, the second polyester layer and the third thin polyester layer are laminated in this order as described above.

The first thin polyester layer is formed of an aromatic polyester containing large-diameter inert particles (a1) and small-diameter inert particles (a2).

The above aromatic polyester is formed from an aromatic dicarboxylic acid as a main acid component and an aliphatic glycol as a main glycol component. This polyester is substantially linear, and can be formed into a film, particularly by melt-molding. Examples of the aromatic dicarboxylic acid include terephthalic acid, naphthalenedicarboxylic acid, isophthalic acid, diphenylmethanedicarboxylic acid, diphenyldicarboxylic acid, diphenyletherdicarboxylic acid, diphenylsulfonedicarboxylic acid, diphenylketonedicarboxylic acid and anthracenedicarboxylic acid. Examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol, and alicyclic diols such as cyclohexanedimethanol.

In the present invention, the aromatic polyester is preferably selected, for example, from aromatic polyesters composed mainly of alkylene terephthalates and/or alkylene naphthalenedicarboxylates.

Of the above aromatic polyesters, particularly preferred are polyethylene terephthalate, polyethylene-2,6-naphthalenedicarboxylate and copolymers in which at least 80 mol % of the entire dicarboxylate component is from terephthalic acid and/or 2,6-naphthalenedicarboxylic acid and at least 80 mol % of the entire glycol component is from ethylene glycol. In the above copolymers, less than 20 mol % of the entire dicarboxylate component can be from the above-described aromatic dicarboxylic acids other than terephthalic acid and 2,6-naphthalenedicarboxylic acid; aliphatic dicarboxylic acids such as adipic acid and sebacic acid; and alicyclic dicarboxylic acids such as cyclohexane-1,4-dicarboxylic acid. Further, less than 20 mol % of the entire glycol component can be from the above-described glycols other than ethylene glycol; aromatic diols such as hydroquinone, resorcinol and 2,2-bis(4-hydroxyphenyl)propane; aliphatic diols having an aromatic ring such as 1,4-dihydroxydimethylbenzene; and polyalkylene glycols (polyoxyalkylene glycols) such as polyethylene glycol, polypropylene glycol and polytetramethylene glycol.

The aromatic polyester used in the present invention may contain a component derived from hydroxycarboxylic acids, i.e., aromatic hydroxy acids such as hydroxybenzoic acid and aliphatic hydroxy acids such as ω-hydroxycaproic acid in addition to the above-described aromatic dicarboxylic acids. This hydroxycarboxylate component may constitute the copolyester or may bond to it. The amount of the hydroxycarboxylate component is 20 mol % or less based on the total amount of the dicarboxylate component and the hydroxycarboxylate component.

Further, the aromatic polyester used in the present invention may contain a component derived from polycarboxylic acids or polyhydroxy compounds having three or more functional groups such as trimellitic acid and pentaerythritol. This component is contained in such an amount that the aromatic polyester is substantially linear, for example, 2 mol % or less based on the entire dicarboxylate component.

The above aromatic polyester is known per se, and can be produced by a method known per se. The above aromatic polyester preferably has an intrinsic viscosity, measured in o-chlorophenol at 35° C., of approximately 0.4 to 0.9.

The large-diameter inert particles (a1) have an average particle diameter, da1, of 0.4 to 2.0 µm, and the small-diameter inert particles (a2) have an average particle diameter, da2, of 0.01 to 0.3 µm.

When particles having an average particle diameter of greater than 2.0 µm are used, the film has too rough a surface, and the magnetic recording medium of which the base film is formed of such film shows poor electromagnetic characteristics and poor abrasion resistance. When particles having an average particle diameter of smaller than 0.4 µm are used, undesirably, the film shows poor running properties.

The average particle diameter of the large-diameter inert particles (a1) is preferably in the range of from 0.4 to 1.0 µm.

The content of the large-diameter inert particle is 0.05 to 0.55% by weight. When the content of the large-diameter inert particles is smaller than 0.05% by weight, the film shows poor running properties. When this content exceeds 0.55% by weight, the film gives a magnetic recording medium which shows poor electromagnetic characteristics and poor abrasion resistance.

The content of the large-diameter inert particles (a1) is preferably 0.1% by weight to 0.5% by weight.

Examples of the large-diameter inert particles (a1) preferably include (1) silicon dioxide (including hydrate, siliceous sand and quartz); (2) alumina in various crystal forms; (3) silicate having an $SiO_2$ content of at least 30% by weight (e.g., noncrystalline or crystalline clay mineral, aluminosilicate (including calcined product and hydrate), zircon and fly ash); (4) oxides of Mg, Zn, Zr and Ti; (5) sulfates of Ca and Ba; (6) phosphates of Li, Na and Ca (including monohydrate and dihydrate); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (e.g., carbon black and graphite); (12) glass (e.g., powdered glass and glass beads); (13) carbonates of Ca and Mg; (14) fluorite; (15) ZnS; and (16) heat-resistant polymer particles (e.g., silicone resin particles, crosslinked acryl particles, crosslinked polystyrene particles, crosslinked styrene-acryl particles, crosslinked polyester particles, Teflon particles, polyimide particles, polyimide-amide particles and melamine resin particles). One or more of the above kinds of particles may be used.

The average particle diameter, da2, of the small-diameter inert particles (a2) is in the range of from 0.01 to 0.3 μm, preferably from 0.05 to 0.25 μm. The content of the small-diameter inert particles is 0.05 to 0.5% by weight, preferably 0.1 to 0.4% by weight.

The above small-diameter inert particles are used for preventing the formation of too flat a film surface. When these small-diameter inert particles are not contained, when the average particle diameter thereof is less than 0.01 μm, or when the content thereof is less than 0.05% by weight, the degree of the inter-film blocking increases to degrade the winding properties. When the average particle diameter of the small-diameter inert particles is greater than 0.3 μm or when the content thereof exceeds 0.5% by weight, the film surface is too rough to maintain the electromagnetic characteristics.

The material for the small-diameter inert particles (a2) is selected from those specified concerning the large-diameter inert particles (a1). As the small-diameter inert particles (a2), one kind or at least two kinds of those particles may be used.

The aromatic polyester for forming the first thin polyester layer may contain, as the large-diameter inert particles, 0.05 to 0.5% by weight of large-diameter inert particles (a11) having an average particle diameter of 0.4 to 0.9 μm and 0.001 to 0.05% by weight of large-diameter inert particles (a12) having an average particle diameter of 1.0 to 1.5 μm.

The biaxially oriented laminated polyester film having the above first thin polyester layer, provided by the present invention, is not only excellent in winding properties and abrasion resistance but also almost free from the occurrence of white dust from side-edge portions of the film. In particular, it is useful as a base film for a magnetic recording medium for a high-speed duplicator.

In the above aromatic polyester containing two kinds of large-diameter inert particles (a11, a12) having different particle diameters, the large-diameter inert particles (a12) are preferably crosslinked polystyrene particles or silicone particles, and the large-diameter inert particles (a11) are preferably silicone particles. Further, the large-diameter inert particles (a12) preferably have an apparent Young's modulus of 10 to 100 kg/mm².

In the above embodiment, the aromatic polyester for forming the first thin polyester layer preferably contains 0.1 to 0.5% by weight of small-diameter inert particles having an average particle diameter of 0.05 to 0.3 μm. In this case, the small-diameter inert particles are preferably amorphous titanium oxide and/or θ-form aluminum oxide particles having a specific surface area of 50 to 120 m²/g.

The first thin polyester layer has a thickness of 0.4 to 2 μm. When this thickness exceeds 2 μm, the film surface is not flattened, and the film shows the same properties as those of a single-layered film. When it is less than 0.4 μm, it is too thin and the lubricity is degraded. When the thickness is in the range of from 0.4 to 2 μm, the roughness of the film surface decreases, presumably for the following reason. When the thickness of the first thin polyester layer is in the above range, fewer particles stick out from the second polyester layer to the surface of the first thin polyester layer. With a decrease in the thickness of the first thin polyester layer, the surface roughness decreases. In this case, high projections in the surface layer remain intact, but the number of low projections formed by the second polyester layer decreases, whereby the surface roughness decreases.

The second polyester layer constituting the biaxially oriented laminated polyester film of the present invention is formed of an aromatic polyester containing large-diameter inert particles (b1) having an average particle diameter, db1, of 0.4 to 2.0 μm.

The above aromatic polyester is preferably selected from those specified concerning the first thin polyester layer.

The average particle diameter of the large-diameter inert particles (b1) is preferably in the range of from 0.4 to 2.0 μm, and the content thereof is preferably 0.01 to 0.2% by weight.

The aromatic polyester for forming the second polyester layer may further contain small-diameter inert particles, b2, having an average particle diameter of 0.01 to 0.3 μm.

The second polyester layer may be formed not only from a newly prepared aromatic polyester, but also from any material recycled, for example, from the biaxially oriented laminated polyester film of the present invention or other polyester films containing inert particles. The second polyester layer may be formed from a homogeneous blend of a polymer recycled from the biaxially oriented laminated polyester film of the present invention and other aromatic polyester, e.g., a newly prepared aromatic polyester. In this case, the amount of the recycled polyester is preferably 30 to 70% by weight, more preferably 40 to 60% by weight.

The third thin polyester layer for constituting the biaxially oriented laminated polyester film of the present invention is formed of an aromatic polyester containing large-diameter inert particles (c1) and small-diameter inert particles (c2).

The above aromatic polyester can be selected from those specified concerning the first thin polyester layer.

Further the description of the large-diameter inert particles (a1) and the small-diameter inert particles (a2) concerning the first thin polyester layer can be applied to the above large-diameter inert particles (c1) and the small-diameter inert particles (c2).

Meanwhile, the thickness of the third thin polyester layer is not necessarily the same as that of the first thin polyester layer. The thickness of the third thin polyester layer can be, for example greater than the thickness of the first thin polyester layer by 0.5 μm or more.

The thickness of the third thin polyester layer is preferably in the range of from 0.4 to 3 μm, and more preferably, it is substantially the same as the thickness of the first thin polyester layer while it is in the above range.

The biaxially oriented laminated polyester film of the present invention comprises, as described above, the first thin polyester layer, the second polyester layer and the third thin polyester layer. Further, these three layers are required to satisfy a predetermined relationship among the contents of large-diameter inert particles in the first thin polyester layer and the second polyester layer, the thicknesses of the first and third thin polyester layers and the thickness of the second polyester layer.

The above relationship is represented by the following expression.

$$0.4 < \frac{W_2 \cdot D_2}{W_1 \cdot D_{13}} < 2.5 \qquad (1)$$

wherein:

$W_1$ is the content (wt. %) of the large-diameter inert particles (a1) in the first thin polyester layer, $W_2$ is the content (wt. %) of the large-diameter inert particles (b1) in the second polyester layer $D_{13}$ is the total of the thickness (μm) of first thin polyester layer and the thickness (μm) of the third thin polyester layer, and $D_2$ is the thickness (μm) of the second polyester layer.

In the above relationship, $W_2 \cdot D_2/W_1 \cdot D_{13}$ corresponds to the ratio of the content of the large-diameter inert particles (b1) in the second polyester layer per unit area of the laminated polyester film to the total of the contents of large-diameter inert particles (a1, c1) in the first and third thin polyester layers per unit area of the laminated polyester film. It has been found that when the above ratio is in the range between 0.4 and 2.5 as described above, the laminated polyester film of the present invention of which the second polyester layer contains the large-diameter inert particles and the first and third thin polyester layers individually have a small thickness, as small as 0.4 to 2 μm, exhibits excellent surface properties and gives excellent electromagnetic characteristics as a magnetic recording medium.

When the above ratio exceeds 2.5, undesirably, the content of the large-diameter inert particles in the second polyester layer is relatively too large, which greatly affects the surface properties of the first and/or third thin polyester layer(s). On the other hand, when the above ratio is smaller than 0.4, the content of relatively large particles in the intermediate layer (second polyester layer) containing a polymer recycled from the laminated polyester film varies to a greater extent as the recycling of laminated polyester films is repeated, and the surface roughness accordingly varies.

The above relationship is preferably represented by the following expression (1)-1, $$0.6 < \frac{W_2 \cdot D_2}{W_1 \cdot D_{13}} < 1.5 \qquad (1)\text{-}1$$

wherein $W_2$, $D_2$, $W_1$ and $D_{13}$ are as defined in the expression (1).

In the biaxially oriented laminated polyester film of the present invention, the thickness, $D_2$, of the second polyester layer is preferably larger than the total thickness, $D_{13}$, of the first and third thin polyester layers.

Further, the total thickness of the first thin polyester layer, the second polyester layer and the third thin polyester layer is advantageously in the range of from 10 to 100 μm, and the polyester film having a thickness in the range of from 10 to 25 μm as the above total thickness can be advantageously used as a base film for a magnetic tape.

In the biaxially oriented laminated polyester film of the present invention, the surface roughness, Ra, of the first thin polyester layer is preferably in the range of from 5 to 20 nm, and one direction in a film plane preferably exhibits a Young's modulus of at least 500 kg/mm².

The biaxially oriented laminated polyester film of the present invention can be produced basically by a conventionally known method or a method available in the field of this art. For example, it can be obtained by preparing a laminated unstretched film first and then biaxially stretching the film. This laminated unstretched film can be produced by a laminated film production method available in the field of this art. For example, it can be obtained by a method in which surfaces-forming film layers (the first and third polyester layers) and an intermediate layer-forming film layer (the second polyester layer) are laminated while they are in a molten state or in a solidified state by cooling. Further specifically, it can be produced by a co-extrusion method or an extrusion laminate method.

The laminated unstretched film obtained by the above lamination method can be biaxially oriented according to a conventionally available method for producing a biaxially oriented film, whereby the biaxially oriented laminated film is obtained. For example, the biaxially oriented laminated film can be produced by stretching the laminated unstretched film monoaxially (in the machine or transverse direction) at a temperature between (Tg−10) and (Tg+70)°C. (Tg: the glass transition temperature of polyester) at a stretch ratio of 2.5 to 5.0, and then stretching the monoaxially stretched film at right angles to the above stretching direction (in the transverse or machine direction) at a temperature between Tg and (Tg+70)°C. at a stretch ratio of 2.5 to 5.0. The area stretch ratio is preferably 9 to 22, and is more preferably 12 to 22. The biaxial stretching may be carried out at the same time or consecutively. Further, the biaxially oriented laminated film may be thermoset at a temperature between (Tg+70)°C. and Tm(°C.). For example, it is preferred to thermoset a laminated polyethylene terephthalate film at a temperature between 190° and 230° C. The time required for the thermosetting is, for example, 1 to 60 seconds.

The biaxially oriented laminated polyester film of the present invention has the following features so long as the above-described conditions are satisfied. For example, that edge portion of a biaxially oriented film which so far cannot be part of a final product and therefore is wasted can be reused as a polymer for the intermediate layer by means of a simple apparatus, and as a result, the biaxially oriented laminated polyester film which has excellent surface properties, i.e., excellent lubricity and abrasion resistance and which can give a magnetic tape having excellent electromagnetic characteristics can be provided at a low cost.

That is, the biaxially oriented laminated polyester film of the present invention can be used as a base film for a magnetic recording medium such as a flexible disk, i.e. floppy disk, or a magnetic tape.

For using it as a base film for a flexible disk, preferably, the thickness of the first thin polyester layer and the thickness of the third thin polyester layer are substantially the same. For using it as a base film for a magnetic tape, preferably, the thickness of the third thin polyester layer is greater than the thickness of the first thin polyester layer by 0.5 μm or more. For using it as a base film for a magnetic tape, preferably, the elongation at break is in the range of from 30 to 120%.

As described above, according to the present invention, there is provided a magnetic recording medium comprising the biaxially oriented laminated polyester film of the present invention as a base film and a magnetic recording layer formed on the first thin polyester layer thereof.

The biaxially oriented laminated polyester film of the present invention has a flat surface, while it exhibits excellent winding properties, running properties and abrasion resistance. Further, it can be produced at a low cost due to the use of a recycle polymer, and it has excellent properties as a base film for a magnetic recording medium. Further, the biaxially oriented laminated polyester film of the present invention of which the first thin polyester layer contains two types of large-diameter inert particles has winding properties, base surface flatness, the capability of preventing the formation of white dust from edge portions and abrasion resistance which are all required of a high-speed duplicator, thus having excellent properties as a base film for a magnetic recording medium.

The present invention will be further detailed hereinafter with reference to Examples.

The physical property values and characteristics in the present invention including Examples were measured or are defined as follows.

(1) Average particle diameter (DP)

Particles were measured for diameters with a centrifugal particle size analyzer CP-50 supplied by Shimadzu Corporation, and there was prepared a cumulative curve from individual diameters of particles and the amounts thereof which were calculated on the basis of the resultant centrifugal sedimentation curve. The cumulative curve was read for a diameter of a particle corresponding to a 50 mass percent, and the so-read value was taken as an average particle diameter (see "Particle Size Measuring Technique" pages 242–247, 1975, issued by Nikkan Kogyo Press).

(2) Film surface roughness (Ra) A film was measured for a centerline average roughness (Ra) according to JIS-B0601 by means of Surfcorder SE-30C supplied by Kosaka Laboratory Co. Ltd. The measurement conditions were as follows.

(a) Radius of contacting needle top: 2 μm (b) Measurement pressure: 30 mg (c) Cut-off: 0.25 mm (d) Measurement length: 2.5 mm (e) How to obtain data One sample was measured six times. The largest measurement value was excluded, and Ra was expressed in terms of an average of the remaining five measurement values.

(3) Blocking index

A glass plate was placed below two stacked films, and the lower film was fixed to the glass plate. The two films were stacked such that a first thin polyester layer was in contact with a third thin polyester layer. A tension detector was attached to one end of the upper film. A "prescale mat" supplied by Fuji Photo Film Co., Ltd. was set on the upper film such that the roughened surface of the prescale mat was in contact with the film, and further, a metal plate and a weight were placed thereon. The total weight of the prescale mat, the metal plate and the weight was adjusted to 300 g, and the prescale mat had an area of 100 cm². In this state, the glass plate was drawn at a rate of 10 cm/minute to detect a tension force with the detector attached to the upper film. The detected value was divided by 300 g, and the quotient was taken as a blocking index. In this method, a load is focussed on the convex portion of the prescale mat, and the degree of blocking can be accurately measured.

(4) Running friction coefficient (μk) of film

A film was measured for a running friction coefficient with an apparatus shown in FIG. 1 in the following manner.

In FIG. 1, numeral 1 indicates a supply reel, numeral 2 indicates a tension controller, numerals 3, 5, 6, 8, 9 and 11 indicate free rollers, numeral 4 indicates a tension detector (inlet), numeral 7 indicates a fixed pin made of stainless steel SUS304 (outer diameter 5 mmϕ, surface roughness Ra=20 nm), numeral 10 indicates a tension detector (outlet), numeral 12 indicates a guide roller, and numeral 13 indicates a wind-up reel.

Under an environment having a temperature of 20° C. and a humidity of 60%, a film was allowed to run (frictionally) at a rate of 200 cm/minute in contact with the fixed pin 7 at an angle θ=(152/180) π radian (152°). When a tension $T_1$ at the inlet was adjusted to 35 g with the tension controller 2, and after the reciprocating running of the film was made 50 times, a tension ($T_2$: g) at the outlet was detected with the outlet tension detector, and the running friction coefficient μk was calculated on the basis of the following equation.

$$\mu k=(2.303/\theta) \log (T_2/T_1)=0.868 \log (T_2/35)$$

Magnetic tapes were prepared as follows.

100 Parts by weight (to be simply referred to as "part" hereinafter) of γ-$Fe_2O_3$ and the following composition were kneaded and dispersed with a ball mill for 12 hours.

| | |
|---|---|
| Polyester polyurethane | 12 parts |
| Vinyl chloride-vinyl acetate-maleic anhydride copolymer | 10 parts |
| α-alumina | 5 parts |
| Carbon black | 1 part |
| Butyl acetate | 70 parts |
| Methyl ethyl ketone | 35 parts |
| Cyclohexanone | 100 parts |

Then, the following components were added.

| | |
|---|---|
| Fatty acid: Oleic acid | 1 part |
| Fatty acid: Palmitic acid | 1 part |
| Fatty acid ester (amyl stearate) | 1 part |

The resultant mixture was kneaded for 10 to 30 minutes, and after 7 parts of an ethyl acetate solution containing 25% of a triisocyanate compound was added, the mixture was shear-dispersed at a high rate for 1 hour to prepare a magnetic coating liquid.

The so-obtained coating liquid was applied to (a first thin polyester layer of) a polyester film such that the dry thickness was 3.5 μm.

The coating was subjected to orientation treatment in a direct current magnetic field and dried at 100° C. Then, the film was calendered and slit to a width of ½ inch to obtain a magnetic tape.

(5) Electromagnetic characteristics

A "VHS" VTR (BR6400, supplied by Victor Co. of Japan, Ltd.) was remodeled, and a signal having a sinewave at 4 MHz was inputted to a recording/reproduction head through an amplifier to record it on a magnetic tape. The signal was reproduced and the reproduced signal was inputted to a spectrum analyzer. A noise generated at a distance of 0.1 MHz from the carrier signal 4 MHz was measured, and the carrier/noise (C/N) ratio was expressed in terms of dB unit. A magnetic tape obtained in comparative Example 7 was measured in this manner to obtain a C/N ratio, which was taken as the standard (±0 dB). A difference between the C/N ratio of the above magnetic tape and the C/N ratio of the magnetic tape obtained in comparative Example 7 was taken as electromagnetic characteristics.

(6) Abrasion resistance

A film was slit to a width of ½ inch, and, while a blade edge (for an industrial razor test, supplied by GKI in U.S.A.) was vertically and downwardly pressed to the slit film so that the slit film was pushed 2 mm apart from its normal running course, the slit film was allowed to run (frictionally) at a rate of 100 m/minute at an inlet tension, $T_1$, of 50 g. After the slit film ran 100 m, the amount of abrasion dust adhering to the blade was evaluated.

<Evaluation>

A: The adhering of abrasion dust to the blade edge was wide as less than 1.0 mm.

B: The adhering of abrasion dust to the blade edge was as wide as 1.0 mm to less than 2.0 mm.

C: The adhering of abrasion dust to the blade edge was as wide as 2.0 mm or more.

(7) Ra variation range when recycle polymer was used.

A laminated polyester film was crushed with a cutter, and remelted and extruded to form a sheet. The sheet was cut to prepare chips. This recycle polymer was used in the intermediate layer in a ratio of 50% based on its total thickness and the remaining 50% was supplemented by a polyester containing no particles. The recycling was repeated 10 times in this manner, and a difference between Ra of the initial laminated polyester film and Ra of a laminated polyester film obtained after the recycling was repeated 10 times was determined.

<Evaluation>

A: The difference was 1 nm or less, or no difference

B: The difference was greater than 1 nm.

(8) Apparent Young's modulus of particles

A micro-compression tester MCTM-201 supplied by Shimadzu Corporation was used. A diamond presser was moved down at a constant load rate (29 mgf/second) to exert external force on one particle. The apparent Young's modulus was determined according to the following equation in which Y is a Young's modulus, P is a load (Kgf) when the particle is broken, Z is a deviation (mm) of the presser when the particle is broken and d is the diameter (mm) of the particle. The above procedure was repeated 10 times, and the average of the ten measurement data was taken as the apparent Young's modulus.

$$Y = 2.8 \, P/\pi dZ$$

(9) Elongation at break

A film was slit to a width of 10 mm and a length of 150 mm, and the slit film was tested with an Instron type universal tensile tester at an interchuck distance of 100 mm at a tension rate of 100 mm/minute. The elongation at break was determined on the basis of the following equation in which L is the elongation when the film was broken and $L_0$ is the interchuck distance.

$$\text{Elongation at break} = \frac{L - L_0}{L_0} \times 100 \, (\%)$$

(10) Pin abrasion resistance

A film was measured for an abrasion resistance against a pin by means of an apparatus shown in FIG. 1 in the following manner.

In FIG. 1, numeral 1 indicates an unwinding reel, numeral 2 indicates a tension controller, numerals 3, 5, 6, 8, 9 and 11 indicate free rollers, numeral 4 indicates a tension detector (inlet), numeral 7 indicates a fixed pin made of stainless steel SUS304 (outer diameter 5 mmϕ, surface roughness Ra=20 nm), numeral 10 indicates a tension detector (outlet), numeral 12 indicates a guide roller, and numeral 13 indicates a wind-up reel.

Under an environment having a temperature of 20° C. and a humidity of 60%, a slit film having a width of ½ inch was allowed to run 200 m at a rate of 200 m/minute in contact with the fixed pin 7 at an angle θ=(90/180) π radian (90°). The tension $T_1$ at the inlet was set at 100 g. Then, the abrasion resistance against a pin was evaluated on the basis of an amount of white dust adhering the fixed pin 7.

<Evaluation>

A: No white dust was found.

B: White dust was slightly found.

C: White dust was clearly found.

D: White dust was heavily found.

(11) Blade abrasion resistance

A slit film having a width of ½ inch was tested under an environment having a temperature of 20° C. and a humidity of 60%. While a blade edge (for an industrial razor test, supplied by GKI in U.S.A.) was vertically and downwardly pressed to the slit film so that the slit film was pushed 2 mm apart from its normal running course, the slit film was allowed to run (frictionally) at a rate of 100 m/minute at an inlet tension, $T_1$, of 50 g. After the slit film ran 100 m, the amount of abrasion dust adhering to the blade was evaluated.

<Evaluation>

A: The adhering of abrasion dust to the blade edge was wide as less than 0.5 mm.

B: The adhering of abrasion dust to the blade edge was as wide as 0.5 mm to less than 1.0 mm.

C: The adhering of abrasion dust to the blade edge was as wide as 1.0 mm to less than 2.0 mm.

D: The adhering of abrasion dust to the blade edge was as wide as 2.0 mm or more.

(12) Winding properties

A slit film having a width of ½ inch was set in an apparatus shown in FIG. 1 such that the slit film did not come through a fixed pin 7. Then, the slit film was allowed to run 500 m at a rate of 400 m/minute and evaluated for winding properties on the basis of whether it could be wound or a roll form of the film.

<Evaluation>

A: The end face of a roll had an uneven height or depth of 1 mm or less.

B: The end face of a roll had an uneven height or depth of greater than 1 mm.

C: A film could not be wound.

(13) Edge portions of slit film

The edge portions of a magnetic tape were observed through a scanning electron microscope at a magnification of 1,000 diameters.

<Evaluation>

A: The edge portions had no whiskers, no burrs and no extending substances, or were clean.

B: The edge portions had whiskers, burrs and extending substances, or were unclean.

The magnetic tape was produced in the same manner as in (4).

(14) White dust on guide roll

A guide roll having a width smaller than the ½ inch width by 0.5 mm and a rib was fixed in the apparatus shown in FIG. 1 in place of the fixed pin 7. A magnetic tape was allowed to run 500 m under tension, $T_1$, of 50 g to determine the amount of white dust adhering to the guide roll.

<Evaluation>

A: No white dust was found, or white dust slightly adhered.

B: White dust was clearly found, or generated in a large amount.

EXAMPLES 1–12

Comparative Examples 1–11

Dimethyl terephthalate and ethylene glycol were polymerized according to a conventional method in the presence of manganese acetate as an ester exchange catalyst, antimony trioxide as a polymerization catalyst, phosphorous acid as a stabilizer and particles shown in the column of "1st and 3rd polyester layers" in Tables 1 to 3 as a lubricant, thereby to obtain a polyethylene terephthalate having an intrinsic viscosity (o-chlorophenol, 35° C.) of 0.62 for producing first and third thin polyester layers.

Further, a polyethylene terephthalate for producing a second polyester layer was obtained in the same manner as above except that the particles were replaced with particles shown in the column of "2nd Polyester layer" in Tables 1 to 3.

The pellets of the above polyethylene terephthalates were dried at 170° C. for 3 hours, and then separately fed to hoppers of extruders. The pellets were melted at a melting temperature of 280° to 300° C., laminated through a multimanifold type co-extrusion die and extruded onto a rotary cooling drum having a surface finish of about 0.3 s and having a surface temperature of 20° C. to give an unstretched laminated film having a thickness of 200 μm.

The so-obtained unstretched laminated film was preheated up to 75° C. and stretched 3.2 times with high-speed and low-speed rolls under heat with three IR heaters having a surface temperature of 800° C., which were positioned 15 mm above the film. The film was then rapidly cooled, fed to a stenter, and stretched 4.5 times in the transverse direction at 120° C. The so-obtained film was thermoset at 205° C. for 5 seconds to give a thermoset biaxially oriented laminated polyester film having a thickness of 14 μm.

The thicknesses of the layers were adjusted by changing the extrusion amounts from the two extruders. For forming the first thin polyester layer and the third thin polyester layer having different thicknesses, adjustment was made by narrowing the flow path for forming one of these layers. The thickness of each layer was determined by both a fluorescence X-ray method and a method in which a thin piece was taken from the film and interfaces were found with a transmission type electron microscope.

Comparative Examples 12 and 13

Single-layered polyester films were obtained in the same manner as in Example 1 except that polyethylene terephthalate containing particles shown in Table 3 were used and that a die for a single layer was used.

Tables 1 to 3 show the properties and characteristics of the above-obtained films. As shown in Tables 1 to 3, the films according to the present invention exhibited excellent electromagnetic characteristics when used in magnetic recording media, and at the same time, they were excellent in lubricity and abrasion resistance. Further, even when a recycle polymer was used, the films according to the present invention showed a small variation of Ra and exhibited excellent properties.

TABLE 1

| | Inert particles in first and third thin polyester layers | | | |
|---|---|---|---|---|
| | Large-diameter inert particles & average particle diameter (μm) | Content of large-diameter inert particles (%) | Small-diameter inert particles & average particle diameter (μm) | Content of small-diameter inert particles (%) |
| Ex. 1 | Calcium carbonate 0.6 | 0.3 | Silicon dioxide 0.1 | 0.2 |
| Ex. 2 | Calcium carbonate 0.6 | 0.3 | Silicon dioxide 0.1 | 0.2 |
| Ex. 3 | Calcium carbonate 0.6 | 0.3 | Silicon dioxide 0.1 | 0.2 |
| Ex. 4 | Calcium carbonate 0.6 | 0.3 | Silicon dioxide 0.1 | 0.2 |
| Ex. 5 | Calcium carbonate 0.6 | 0.3 | Silicon dioxide 0.1 | 0.2 |
| Ex. 6 | Calcium carbonate 0.6 | 0.3 | Silicon dioxide 0.1 | 0.2 |
| Ex. 7 | Silicone resin 0.6 | 0.1 | Aluminum oxide 0.08 | 0.3 |
| Ex. 8 | Calcium carbonate 0.6 Silicon dioxide 0.4 | 0.3 0.1 | Aluminum oxide 0.08 | 0.3 |
| Ex. 9 | Crosslinked polystyrene 0.6 | 0.1 | Titanium dioxide 0.2 | 0.3 |
| Ex. 10 | Calcium carbonate 0.8 Silicone resin 0.6 Silicon dioxide 0.4 | 0.1 0.1 0.1 | Aluminum oxide 0.08 | 0.3 |
| Ex. 11 | Calcium carbonate 0.6 | 0.3 | Silicon dioxide 0.1 | 0.2 |
| Ex. 12 | Calcium carbonate 0.6 | 0.3 | Silicon dioxide 0.1 | 0.2 |

| | Thicknesses of 1st and 3rd thin polyester layers | | Inert particles for 2nd polyester layer | | | Thickness of 2nd polyester layer (μm) |
|---|---|---|---|---|---|---|
| | 1st (μm) | 3rd (μm) | Large-diameter inert particles & average particle diameter (μm) | Content large-diameter inert particle (%) | R value * | |
| Ex. 1 | 1.0 | 1.0 | Calcium carbonate 0.6 | 0.05 | 1.0 | 12.0 |

TABLE 1-continued

| | | | | | | |
|---|---|---|---|---|---|---|
| Ex. 2 | 0.6 | 0.6 | Calcium carbonate 0.6 | 0.028 | 1.0 | 12.8 |
| Ex. 3 | 1.4 | 1.4 | Calcium carbonate 0.6 | 0.075 | 1.0 | 11.2 |
| Ex. 4 | 0.6 | 1.4 | Calcium carbonate 0.6 | 0.05 | 1.0 | 12.0 |
| Ex. 5 | 0.5 | 2.5 | Calcium carbonate 0.6 | 0.082 | 1.0 | 11.0 |
| Ex. 6 | 1.0 | 1.0 | Calcium carbonate 0.6 | 0.075 | 1.5 | 12.0 |
| Ex. 7 | 1.0 | 1.0 | Silicone resin 0.6 | 0.017 | 1.0 | 12.0 |
| Ex. 8 | 1.0 | 1.0 | Calcium carbonate 0.6 | 0.067 | 1.0 | 12.0 |
| Ex. 9 | 1.0 | 1.0 | Calcium carbonate 0.6 | 0.05 | 1.0 | 12.0 |
| Ex. 10 | 1.0 | 1.0 | Calcium carbonate 0.8 | 0.017 | 1.0 | 12.0 |
| | | | Silicone resin 0.6 | 0.017 | | |
| | | | Silicon dioxide 0.4 | 0.017 | | |
| Ex. 11 | 1.0 | 1.0 | Calcium carbonate 0.8 | 0.05 | 1.0 | 12.0 |
| Ex. 12 | 1.0 | 1.0 | Calcium carbonate 0.8 | 0.01 | 1.0 | 12.0 |
| | | | Silicone resin 0.6 | 0.04 | | |

| | Ra (nm) | | | | | | Range of of Ra |
|---|---|---|---|---|---|---|---|
| | 1st thin polyester layer | 3rd thin polyester layer | Blocking index | Running friction coefficient | Electromagnetic characteristics | Abrasion resistance | variation when recycle polymer used |
| Ex. 1 | 12 | 12 | 0.25 | 0.23 | +2.1 | A | A |
| Ex. 2 | 9 | 9 | 0.25 | 0.23 | +3.0 | A | A |
| Ex. 3 | 14 | 14 | 0.25 | 0.23 | +1.9 | A | A |
| Ex. 4 | 9 | 14 | 0.25 | 0.23 | +3.0 | A | A |
| Ex. 5 | 8 | 18 | 0.22 | 0.23 | +2.8 | A | A |
| Ex. 6 | 14 | 14 | 0.22 | 0.23 | +1.9 | A | A |
| Ex. 7 | 12 | 12 | 0.23 | 0.20 | +2.1 | A | A |
| Ex. 8 | 14 | 14 | 0.22 | 0.18 | +1.8 | A | A |
| Ex. 9 | 14 | 14 | 0.26 | 0.23 | +2.0 | A | A |
| Ex. 10 | 14 | 14 | 0.23 | 0.18 | +1.9 | A | A |
| Ex. 11 | 13 | 13 | 0.24 | 0.23 | +2.5 | A | A |
| Ex. 12 | 12 | 12 | 0.23 | 0.23 | +2.2 | A | A |

*R value = $\dfrac{W_2 \cdot D_2}{W_1 \cdot D_{13}}$

TABLE 2

| | Inert particles in first and third thin polyester layers | | | |
|---|---|---|---|---|
| | Large-diameter inert particles & average particle diameter (μm) | Content of large-diameter inert particles (%) | Small-diameter inert particles & average particle diameter (μm) | Content of small-diameter inert particles (%) |
| CEx. 1 | Calcium carbonate 0.6 | 0.3 | — | — |
| CEx. 2 | Calcium carbonate 0.6 | 0.3 | Silicon dioxide 0.1 | 0.2 |
| CEx. 3 | — | — | Silicon dioxide 0.1 | 0.2 |
| CEx. 4 | Calcium carbonate 0.6 | 0.01 | Silicon dioxide 0.1 | 0.2 |
| CEx. 5 | Calcium carbonate 0.6 | 1.0 | Silicon dioxide 0.1 | 0.2 |
| CEx. 6 | Calcium carbonate 0.6 | 0.3 | Silicon dioxide 0.1 | 0.2 |

TABLE 2-continued

| | | | | |
|---|---|---|---|---|
| CEx. 7 | Calcium carbonate 0.6 | 0.3 | Silicon dioxide 0.1 | 0.2 |
| CEx. 8 | Calcium carbonate 0.6 | 0.3 | Silicon dioxide 0.1 | 0.2 |
| CEx. 9 | Calcium carbonate 0.6 | 0.3 | Silicon dioxide 0.1 | 0.2 |
| CEx. 10 | Calcium carbonate 3.0 | 0.3 | Silicon dioxide 0.1 | 0.2 |
| CEx. 11 | Calcium carbonate 0.6 | 0.3 | Silicon dioxide 0.1 | 0.2 |

| | Thicknesses of 1st and 3rd thin polyester layers | | Inert particles for 2nd polyester layer | | | Thickness of 2nd polyester layer (μm) |
|---|---|---|---|---|---|---|
| | 1st (μm) | 3rd (μm) | Large-diameter inert particles & average particle diameter (μm) | Content large-diameter inert particle (%) | R value * | |
| CEx. 1 | 1.0 | 1.0 | Calcium carbonate 0.6 | 0.05 | 1.0 | 12.0 |
| CEx. 2 | 1.0 | 1.0 | — | — | 0 | 12.0 |
| CEx. 3 | 1.0 | 1.0 | Calcium carbonate 0.6 | 0.3 | — | 12.0 |
| CEx. 4 | 1.0 | 1.0 | Calcium carbonate 0.6 | 0.002 | 1.0 | 12.0 |
| CEx. 5 | 0.6 | 0.6 | Calcium carbonate 0.6 | 0.094 | 1.0 | 12.8 |
| CEx. 6 | 0.3 | 0.3 | Calcium carbonate 0.6 | 0.013 | 1.0 | 13.4 |
| CEx. 7 | 2.5 | 2.5 | Calcium carbonate 0.6 | 0.17 | 1.0 | 9.0 |
| CEx. 8 | 1.0 | 1.0 | Calcium carbonate 0.6 | 0.2 | 4.0 | 12.0 |
| CEx. 9 | 1.0 | 1.0 | Calcium carbonate 0.6 | 0.006 | 0.12 | 12.0 |
| CEx. 10 | 1.0 | 1.0 | Calcium carbonate 0.6 | 0.05 | 1.0 | 12.0 |
| CEx. 11 | 1.0 | 1.0 | Calcium carbonate 3.0 | 0.05 | 1.0 | 12.0 |

| | Ra (nm) | | Blocking index | Running friction coefficient | Electromagnetic characteristics | Abrasion resistance | Range of of Ra variation when recycle polymer used |
|---|---|---|---|---|---|---|---|
| | 1st thin polyester layer | 3rd thin polyester layer | | | | | |
| CEx. 1 | 12 | 12 | 0.45 | 0.23 | +2.3 | A | A |
| CEx. 2 | 11 | 11 | 0.25 | 0.23 | +2.4 | A | B |
| CEx. 3 | 12 | 12 | 0.30 | 0.38 | +2.5 | A | B |
| CEx. 4 | 5 | 5 | 0.30 | 0.32 | +3.5 | A | A |
| CEx. 5 | 23 | 23 | 0.20 | 0.22 | −1.3 | C | A |
| CEx. 6 | 9 | 9 | 0.24 | 0.23 | +2.5 | C | A |
| CEx. 7 | 18 | 18 | 0.24 | 0.23 | ±0 | A | A |
| CEx. 8 | 17 | 17 | 0.23 | 0.23 | +0.5 | A | B |
| CEx. 9 | 11 | 11 | 0.25 | 0.23 | +2.3 | A | B |
| CEx. 10 | 30 | 30 | 0.20 | 0.21 | −2.1 | C | A |
| CEx. 11 | 24 | 24 | 0.23 | 0.23 | −1.3 | A | A |

*R value = $\dfrac{W_2 \cdot D_2}{W_1 \cdot D_{13}}$

TABLE 3

| | Single-layered film | | | | |
|---|---|---|---|---|---|
| | Large-diameter inert particles & average particle diameter (μm) | Content of large-diameter inert particles (%) | Small-diameter inert particles & average particle diameter (μm) | Content of small-diameter inert particles (%) | Film thickness (μm) |
| CEx. 12 | Calcium carbonate 0.6 | 0.3 | Silicon dioxide 0.1 | 0.2 | 14.0 |
| CEx. 13 | Calcium carbonate 0.6 | 0.3 | — | — | 14.0 |

| | Ra (nm) | Blocking index | Running friction coefficient | Electro-magnetic characteristics | Abrasion resistance | Range of of Ra variation when recycle polymer used |
|---|---|---|---|---|---|---|
| CEx. 12 | 18 | 0.23 | 0.23 | ±0 | A | A |
| CEx. 13 | 17 | 0.25 | 0.23 | ±0 | A | A |

EXAMPLES 13–26

Dimethyl terephthalate and ethylene glycol were polymerized according to a conventional method in the presence of manganese acetate as an ester exchange catalyst, antimony trioxide as a polymerization catalyst, phosphorous acid as a stabilizer and particles shown in the column of "1st and 3rd polyester layers" in Table 4 as a lubricant, thereby to obtain a polyethylene terephthalate having an intrinsic viscosity (o-chlorophenol, 35° C.) of 0.56 for producing first and third thin polyester layers.

Further, a polyethylene terephthalate for producing a second polyester layer was obtained in the same manner as above except that R (value) was set at 1.0 and that the particles were replaced with particles shown in the column of "2nd Polyester layer" in Table 4.

The pellets of the above polyethylene terephthalates were dried at 170° C. for 3 hours, and then separately fed to hoppers of two extruders. The pellets were melted at a melting temperature of 280° to 300° C., laminated through a multimanifold type co-extrusion die to form a laminated sheet in which a first thin polyester layer was on one surface of a second polyester layer and a third thin polyester layer was on the other surface of the second polyester layer, and extruded onto a rotary cooling drum having a surface finish of about 0.3 s and having a surface temperature of 20° C. such that the first thin polyester layer was brought into contact with the drum surface to give an unstretched laminated film having a thickness of 200 μm.

The so-obtained unstretched laminated film was preheated up to 75° C. and stretched 3.2 times with high-speed and low-speed rolls under heat with three IR heaters having a surface temperature of 800° C., which were positioned 15 mm above the film. The film was then rapidly cooled, fed to a stenter, and stretched 4.3 times in the transverse direction at 120° C. The so-obtained biaxially oriented film was thermoset at 205° C. for 5 seconds to give a thermoset biaxially oriented laminated polyester film having a thickness of 14 μm.

The thicknesses of the layers were adjusted by changing the extrusion amounts from the two extruders. For forming the first thin polyester layer and the third thin polyester layer having different thicknesses, adjustment was made by narrowing the flow path for forming one of these layers. The thickness of each layer was determined by both a fluorescence X-ray method and a method in which a thin piece was taken from the film and interfaces were found with a transmission type electron microscope.

EXAMPLE 27

Polyethylene-2,6-naphthalenedicarboxylate for forming first and third thin polyester layers and polyethylene-2,6-naphthalenedicarboxylate for forming a second polyester layer were prepared in the same manner as in Example 14 except that dimethyl terephthalate was replaced with dimethyl-2,6-naphthalenedicarboxylate.

These polyethylene-2,6-naphthalenedicarboxylates were dried at 170° C. for 3 hours, and then an unstretched laminated film was obtained from these polyethylene-2,6-naphthalenedicarboxylates in the same manner as in Example 14 except that the surface temperature of the rotary cooling drum was changed to 60° C. The so-obtained unstretched laminated film was preheated up to 120° C. and stretched 4.7 times with high-speed and low-speed rolls under heat with three IR heaters having a surface temperature of 800° C., which were positioned 15 mm above the film. The film was then rapidly cooled, fed to a stenter, and stretched 5.2 times in the transverse direction at 150° C. The so-obtained biaxially oriented film was thermoset at 215° C. for 5 seconds to give a thermoset biaxially oriented laminated polyester film having a thickness of 14 μm.

Table 4 shows the properties and characteristics of the above-obtained films. As shown in Table 4, the films according to the present invention exhibited excellent electromagnetic characteristics when used in magnetic recording media, and at the same time, they were excellent in winding properties and abrasion resistance. Further, when a film scrap resulted from the production of the films shown in Table 4 was chipped and used to form a second polyester layer in such an amount that it formed 50% of the entire film thickness, the range of Ra variation was 1 nm or less, or the variation was very small.

TABLE 4

| | | Inert particles in 1st and 3rd layrs | | | | | | 1st and 3rd thin polyester layers | |
|---|---|---|---|---|---|---|---|---|---|
| | | Large-diameter inert particles | | | | Small-diameter inert particles | | Thickness of 1st thin polyester layer (μm) | Thickness of 3rd thin polyester layer (μm) |
| | Poly-ester | Particle & average particle diameter (μm) | Content (%) | Apparent elastic modulus of particles (kg/mm²) | Particle & average particle diameter (μm) | Content (%) | Particle & average particle diameter (μm) | Content (%) | | |
| Ex. 13 | PET | Silicone resin 1.2 | 0.005 | 50 | Silicone resin 0.6 | 0.1 | — | — | 1.0 | 1.0 |
| Ex. 14 | PET | Silicone resin 1.2 | 0.005 | 50 | Silicone resin 0.6 | 0.1 | θ-aluminum oxide 0.1 | 0.2 | 1.0 | 1.0 |
| Ex. 15 | PET | Silicone resin 1.2 | 0.005 | 50 | Silicone resin 0.6 | 0.1 | amorphous titanium oxide 0.08 | 0.2 | 1.0 | 1.0 |
| Ex. 16 | PET | Crosslinked polystyrene 1.2 | 0.005 | 25 | Silicone resin 0.6 | 0.1 | θ-aluminum oxide 0.1 | 0.2 | 1.0 | 1.0 |
| Ex. 17 | PET | Calcium carbonate 1.0 | 0.03 | 90 | Silicone resin 0.6 | 0.1 | θ-aluminum oxide 0.1 | 0.2 | 1.0 | 1.0 |
| Ex. 18 | PET | Crosslinked polystyrene 1.2 | 0.004 | 25 | Calcium carbonate 0.6 | 0.25 | θ-aluminum oxide 0.1 | 0.2 | 1.0 | 1.0 |
| Ex. 19 | PET | Silicone resin 1.2 | 0.005 | 50 | Calcium carbonate 0.60 Spherical silica 0.4 | 0.25 0.1 | θ-aluminum oxide 0.1 | 0.2 | 1.0 | 1.0 |
| Ex. 20 | PET | Crosslinked polystyrene 1.2 | 0.004 | 25 | Silicone resin 0.6 | 0.1 | θ-aluminum oxide 0.1 amorphous titanium oxide 0.08 | 0.1 0.1 | 1.0 | 1.0 |
| Ex. 21 | PET | Silicone resin 1.4 | 0.003 | 50 | Silicone resin 0.6 | 0.1 | θ-aluminum oxide 0.1 | 0.2 | 1.0 | 1.0 |
| Ex. 22 | PET | Silicone resin 1.2 | 0.005 | 50 | Silicone resin 0.6 | 0.1 | θ-aluminum oxide 0.1 | 0.2 | 0.6 | 0.6 |
| Ex. 23 | PET | Silicone resin 1.2 | 0.005 | 50 | Silicone resin 0.6 | 0.1 | θ-aluminum oxide 0.1 | 0.2 | 1.5 | 1.5 |
| Ex. 24 | PET | Silicone resin 1.2 | 0.005 | 50 | Silicone resin 0.6 | 0.1 | θ-aluminum oxide 0.1 | 0.2 | 0.5 | 1.5 |
| Ex. 25 | PET | Spherical silica 1.2 | 0.006 | 200 | Silicone resin 0.6 | 0.1 | θ-aluminum oxide 0.1 | 0.2 | 1.0 | 1.0 |
| Ex. 26 | PET | Silicone resin 1.2 | 0.005 | 90 | Silicone resin 0.6 | 0.1 | θ-aluminum oxide 0.1 | 0.2 | 1.0 | 1.0 |
| Ex. 27 | PEN | Silicone resin 1.2 | 0.005 | 50 | Silicone resin 0.6 | 0.1 | θ-aluminum oxide 0.1 | 0.2 | 1.0 | 1.0 |

| | 2nd polyester layer thickness of 2nd polyester layer (μm) | Ra 1st thin polyester layer (nm) | Ra 3rd thin polyester layer (nm) | Elongation at break in transverse direction (%) | Winding properties | Pin abrasion resistance | Blade abrasion resistance | Side section of slit | Electro-magnetic characteristics C/N | White dust on guide roll |
|---|---|---|---|---|---|---|---|---|---|---|
| Ex. 13 | 12.0 | 9 | 9 | 100 | A | A | A | A | +3.0 | A |
| Ex. 14 | 12.0 | 10 | 10 | 100 | A | A | A | A | +2.9 | A |
| Ex. 15 | 12.0 | 10 | 10 | 100 | A | A | A | A | +3.0 | A |
| Ex. 16 | 12.0 | 10 | 10 | 100 | A | A | A | A | +3.1 | A |
| Ex. 17 | 12.0 | 12 | 12 | 100 | A | A | B | A | +2.3 | A |
| Ex. 18 | 12.0 | 11 | 11 | 100 | A | B | A | A | +2.8 | A |
| Ex. 19 | 12.0 | 12 | 12 | 100 | A | B | B | A | +2.7 | A |
| Ex. 20 | 12.0 | 10 | 10 | 100 | A | A | A | A | +3.0 | A |
| Ex. 21 | 12.0 | 10 | 10 | 100 | A | A | A | A | +3.0 | A |
| Ex. 22 | 12.8 | 7 | 7 | 100 | A | B | B | A | +3.5 | A |
| Ex. 23 | 11.0 | 12 | 12 | 100 | A | A | A | A | +2.5 | A |
| Ex. 24 | 12.0 | 7 | 12 | 100 | A | A | A | A | +2.8 | A |

TABLE 4-continued

| | | | | | | | | | | |
|---|---|---|---|---|---|---|---|---|---|---|
| Ex. 25 | 12.0 | 10 | 10 | 100 | A | A | B | A | +3.1 | A |
| Ex. 26 | 12.0 | 10 | 10 | 100 | A | A | B | A | +3.1 | A |
| Ex. 27 | 12.0 | 10 | 10 | 60 | A | A | A | A | +3.3 | A |

PET: Polyethylene terephthalate
PEN: Polyethylene-2,6-naphthalenedicarboxylate

What is claimed is:

1. A biaxially oriented laminated polyester film comprising:

(A) a first thin polyester layer having a thickness of 0.5 to 2 µm, formed of an aromatic polyester containing:
  (a1) large-diameter inert particles having an average particle diameter of 0.4 to 2.0 µm and
  (a2) small-diameter inert particles having an average particle diameter of 0.01 to 0.3 µm,
  the content of the large-diameter inert particles (a1) in the first thin layer being 0.05 to 0.5% by weight and the content of the small-diameter inert particles (a2) in the first thin layer being 0.05 to 0.5% by weight, both based on the weight of the first thin layer, (B) a second polyester layer formed of an aromatic polyester containing:
  (b1) large-diameter inert particles having an average particle diameter of 0.4 to 2.0 µm, and (C) a third thin polyester layer having a thickness of 0.5 to 3 µm, formed of an aromatic polyester containing:
  (c1) large-diameter inert particles having an average particle diameter of 0.4 to 2.0 µm and
  (c2) small-diameter inert particles having an average particle diameter of 0.01 to 0.3 µm,
  the content of the large-diameter inert particles (c1) in the third thin layer being 0.05 to 0.5% by weight and the content of the small-diameter inert particles (c2) in the third thin layer being 0.05 to 0.5% by weight, both based on the weight of the third thin layer, the first thin polyester layer, the second polyester layer and the third thin polyester layer being laminated in the above order, the biaxially oriented laminated polyester film satisfying the following expression (1), $$0.4 < \frac{W_2 \cdot D_2}{W_1 \cdot D_{13}} < 2.5 \quad (1)$$

wherein:
  $W_1$ is the content (wt %) of the large-diameter inert particles (a1) in the first thin polyester layer,
  $W_2$ is the content (wt %) of the large-diameter inert particles (b1) in the second polyester layer,
  $D_{13}$ is a total of the thickness (µm) of the first thin polyester layer and the thickness (µm) of the third thin polyester layer, and
  $D_2$ is the thickness (µm) of the second polyester layer.

2. The film of claim 1, wherein the thickness, $D_2$, of the second polyester layer is greater than the total, $D_{13}$, of the thickness of the first thin polyester layer and the thickness of the third thin polyester layer.

3. The film of claim 1, wherein the first thin polyester layer, the second polyester layer and the third thin polyester layer have a total thickness in the range of from 10 to 100 µm.

4. The film of claim 3, wherein the total thickness is in the range of from 10 to 25 µm.

5. The film of claim 1, wherein the thickness of the first thin polyester layer and the thickness of the third thin polyester layer are substantially the same.

6. The film of claim 1, wherein the first thin polyester layer contains 0.1% by weight to less than 0.5% by weight of the large-diameter inert particles (a1).

7. The film of claim 1, wherein the first thin polyester layer contains 0.05 to 0.5% by weight of large-diameter inert particles (a11) having an average particle diameter of 0.4 to 0.9 µm and 0.001 to 0.05% by weight of large-diameter inert particles (a12) having an average particle diameter of 1.0 to 1.5 µm.

8. The film of claim 1, wherein the aromatic polyester forming the second polyester layer contains 0.01 to 0.2% by weight of the large-diameter inert particles (b1) having an average particle diameter of 0.4 to 2.0 µm.

9. The film of claim 1, wherein the aromatic polyester forming the second polyester layer further contains small-diameter inert particles (b2) having an average particle diameter of 0.01 to 0.3 µm.

10. The film of claim 1, wherein the biaxially oriented laminated polyester film satisfies the following expression (1)-1, $$0.6 < \frac{W_2 \cdot D_2}{W_1 \cdot D_{13}} < 1.5 \quad (1)\text{-}1$$

wherein $W_2$, $D_2$, $W_1$ and $D_{13}$ are as defined in the expression (1).

11. The film of claim 1, wherein the second polyester layer is formed from a homogeneous blend of a polymer recycled from a biaxially oriented laminated polyester film containing the same components as the film of claim 1 and other aromatic polyester.

12. The film of claim 11, wherein the second layer contains recycled polymer in an amount of 30 to 70% by weight based on the weight of the entire laminated film.

13. A magnetic recording medium having the film of claim 1 as a base film.

14. The magnetic recording medium of claim 13, wherein the magnetic recording medium is a floppy disk and the thickness of the first thin polyester layer and the thickness of the third thin polyester layer are substantially the same.

15. The magnetic recording medium of claim 13, wherein the magnetic recording medium is a magnetic tape and the thickness of the third thin polyester layer is greater than the thickness of the first thin polyester layer by 0.5 µm or more.

16. The film of claim 1, wherein the first thin polyester layer has a surface roughness, Ra, in the range of from 5 to 20 nm.

17. The film of claim 1, wherein the film has a Young's modulus of at least 500 kg/mm² in one direction.

18. A magnetic tape having the film of claim 17 as a base film, wherein the film has an elongation at break in the range of from 30 to 120%.

19. A magnetic recording medium comprising the film of claim 1 as a base film and a binder-containing magnetic layer formed on the first thin polyester layer of the film.

20. A magnetic recording medium having a biaxially oriented laminated polyester base film comprising:

(A) a first thin polyester layer having a thickness of 0.5 to 2 μm, formed of an aromatic polyester containing:
  (a1) large-diameter inert particles having an average particle diameter of 0.4 to 2.0 μm and
  (a2) small-diameter inert particles having an average particle diameter of 0.01 to 0.3 μm,
  the content of the large-diameter inert particles (a1) in the first thin layer being 0.05 to 0.5% by weight and the content of the small-diameter inert particles (a2) in the first thin layer being 0.05 to 0.5% by weight, both based on the weight of the first thin layer,
(B) a second polyester layer formed of an aromatic polyester containing:
  (b1) large-diameter inert particles having an average particle diameter of 0.4 to 2.0 μm, and
  (b2) small-diameter inert particles having an average particle diameter of 0.01 to 0.3 μm,
  the content of the large-diameter inert particles (b1) in the second layer being 0.01 to 0.2% by weight based on the weight of the second layer,
(C) a third thin polyester layer having a thickness of 0.5 to 3 μm, formed of an aromatic polyester containing:
  (c1) large-diameter inert particles having an average particle diameter of 0.4 to 2.0 μm and
  (c2) small-diameter inert particles having an average particle diameter of 0.01 to 0.3 μm,
  the content of the large-diameter inert particles (c1) in the third thin layer being 0.05 to 0.5% by weight and the content of the small-diameter inert particles (c2) in the third thin layer being 0.05 to 0.5% by weight, both based on the weight of the third thin layer,
the first thin polyester layer, the second polyester layer and the third thin polyester layer being laminated in the above order,
the first thin polyester layer, the second polyester layer and the third thin polyester layer have a total thickness in the range of from 10 to 100 μm,
the biaxially oriented laminated polyester film satisfying the following expression (1)-1, $$0.6 < \frac{W_2 \cdot D_2}{W_1 \cdot D_{13}} < 1.5 \qquad (1)\text{-}1$$

wherein:
  $W_1$ is the content (wt. %) of the large-diameter inert particles (a1) in the first thin polyester layer,
  $W_2$ is the content (wt. %) of the large-diameter inert particles (b1) in the second polyester layer,
  $D_{13}$ is a total of the thickness (μm) of the first thin polyester layer and the thickness (μm) of the third thin polyester layer, and
  $D_2$ is the thickness (μm) of the second polyester layer.

21. The magnetic recording medium of claim 20, wherein the thickness, $D_2$, of the second polyester layer is greater than the total, $D_{13}$, of the thickness of the first thin polyester layer and the thickness of the third thin polyester layer.

22. The magnetic recording medium of claim 20, wherein the total film thickness is in the range of from 10 to 25 μm.

23. The magnetic recording medium of claim 20, wherein the thickness of the first thin polyester layer and the thickness of the third thin polyester layer are substantially the same.

24. The magnetic recording medium of claim 20, wherein the second polyester layer is formed from a 30 to 70% by weight, based on the weight of the entire laminated film, of a homogenous blend of a polymer recycled from the biaxially oriented laminated polyester film of claim 21 and other aromatic polyester.

25. The magnetic recording medium of claim 20, wherein the first thin polyester layer has a surface roughness, Ra, in the range of from 5 to 20 nm.

* * * * *